United States Patent [19]  [11] Patent Number: 4,498,777
Scott  [45] Date of Patent: Feb. 12, 1985

[54] APPARATUS FOR DETERMINING THE POSITION OF A POINT ON AN OBJECT OR THE SHAPE OF A PORTION THEREOF

[76] Inventor: Peter J. Scott, 9 Whitehall Park, London, England, N19 3TS

[21] Appl. No.: 347,294

[22] Filed: Feb. 9, 1982

[30] Foreign Application Priority Data

Feb. 16, 1981 [GB] United Kingdom ................. 8104774

[51] Int. Cl.³ .............................................. B43L 13/16
[52] U.S. Cl. .................................... 356/376; 33/20 R
[58] Field of Search .................. 356/376, 2; 33/20 R, 33/20 B, 20 C, 18 R, 18 C; 350/174

[56] References Cited

U.S. PATENT DOCUMENTS

| 216,460 | 6/1879 | Rosquist | 33/20 C |
| 2,641,840 | 6/1953 | Garriss | 33/20 C |
| 4,399,612 | 8/1983 | Scott | 33/20 R |

FOREIGN PATENT DOCUMENTS 2503053 8/1975 Fed. Rep. of Germany .......... 356/2

Primary Examiner—R. A. Rosenberger
Attorney, Agent, or Firm—Steele, Gould & Fried

[57] ABSTRACT

Apparatus for determining the position of a point on an object or the shape of a portion thereof comprising an object table; a measuring index; an optical viewing device; a part-reflecting mirror device arranged to enable an image of the measuring mark to be brought into coincidence with the said point or portion when the object is viewed through the optical viewing device; a movement effecting device for effecting relative movement of the object table and of the measuring index so as to bring the image of the measuring index into said coincidence; and, an indicator responsive to said movement effecting device for indicating the position of said point or the shape of said portion.

15 Claims, 6 Drawing Figures

APPARATUS FOR DETERMINING THE POSITION OF A POINT ON AN OBJECT OR THE SHAPE OF A PORTION THEREOF

BACKGROUND OF THE INVENTION

This invention concerns an apparatus for determining the position of a point on an object or the shape of a portion thereof. Thus it may be employed for producing a plot, contour or measurement of a small object of complicated shape, e.g. a pot shard or a denture cast used in the study or orthodontics, or for determining the co-ordinates of a point or points on an object.

Any form of direct measurement of such an object is necessarily limited, and individual measurements of parts of such an object usually have to be effected independently of each other since a measuring tool capable of reaching all points of such an object is very difficult to design. Detailed measurement of such an object in a defined and constant reference system is usually practical only in some form of indirect measurement where the necessary instrument is not in contact with the object. For example, the object may be photographed from two positions, and the two photographs may be used in a stereo-plotting instrument to provide a plot of the object from which the required measurement or measurements may be made. Such stereo-plotting instruments, however, are very expensive, necessitate considerable operator training, and are subject to the errors arising from photographic distortion.

SUMMARY OF THE INVENTION

According to the present invention, there is therefore provided apparatus for determining the position of a point on an object or the shape of a portion thereof comprising an object table; a measuring mark or index; an optical viewing device; a part-reflecting mirror device arranged to enable an image of the measuring mark or index to be brought into coincidence with said point or portion when the object is viewed through the optical viewing device; movement effecting means for effecting relative movement of the object table and of the measuring mark or index so as to bring the image of the measuring mark or index into said coincidence; and means responsive to said movement effecting means for indicating the position of said point or the shape of the said portion.

Preferably, the optical viewing device, the part-reflecting mirror, and the object table are arranged linearly of each other.

The measuring mark or index is preferably disposed to the side of the mirror device adjacent said optical viewing device.

Such apparatus may be produced for a small fraction of the cost of stereo-plotting instrument. Moreover, an operator may be trained to use such an apparatus much more quickly than to use such an instrument.

Preferably there are means for moving the object table in the X and Y directions of a three dimensional rectangular coordinate system; and means for moving the measuring mark or index towards and away from the mirror device to enable an image of the measuring mark or index to be moved in the Z direction.

Preferably the measuring mark or index is carried by a Z carriage which is mounted for movement in the direction of the Y axis.

Preferably there are means for adjusting the optical viewing device to enable it to be focussed both on said point on the object and on said image.

The optical viewing device may be adjusted by moving it towards or away from the mirror device.

The mirror device may comprise a part-reflecting mirror one of whose opposite surfaces is treated so that its reflectance is greater than the other.

The optical viewing device may be a stereoscopic microscope or may comprise two telescopes.

The optical viewing device and the mirror device may be carried by a common frame.

There may be means for levelling the object table with respect to a datum.

There may be means for providing a digital indication of the setting of the movement effecting means and thereby of the X, Y and Z co-ordinates of a point.

The object table may be connected to a plotting member.

The invention also comprises a method of determining the position of a point on an object or the shape of a portion thereof comprising the steps of: using an optical viewing device to view the object by way of a part-reflecting mirror device, bringing an image of a measuring mark or index into coincidence with a point on the object or portion thereof by effecting relative movement of the object and of the measuring mark or index, and determining the position of the point or shape of the object from the relative positions of the object and of the measuring mark or index.

BRIEF DESCRIPTION OF THE DRAWINGS

The invention is illustrated, merely by way of example, in the accompanying drawings, in which.

DETAILED DESCRIPTION OF THE PREFERRED EMBODIMENTS

Figure 1:
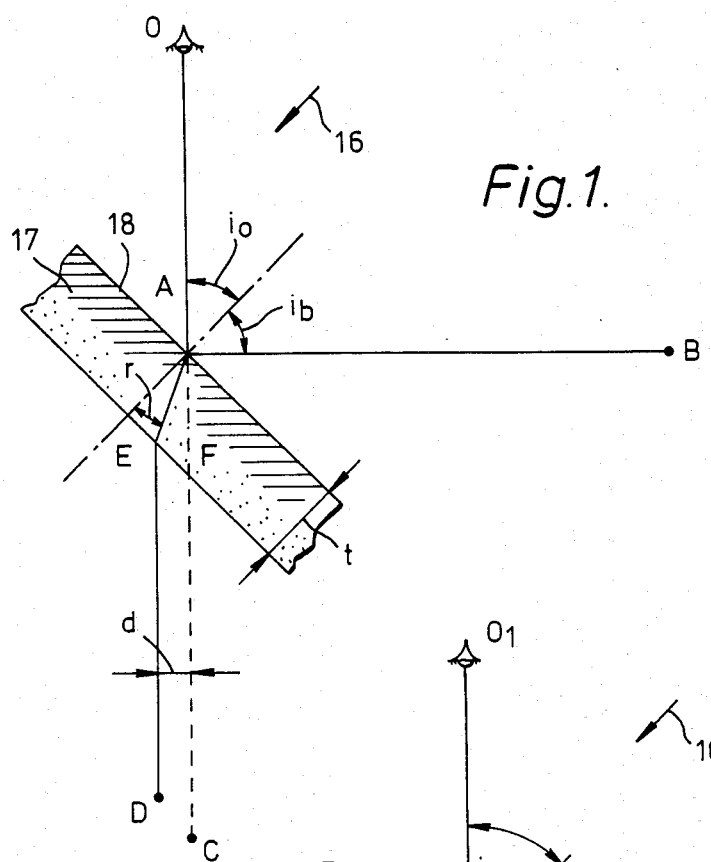
FIGS. 1 and 2 are diagrams illustrating the optical principles underlying an apparatus according to the present invention.
Figure 2:
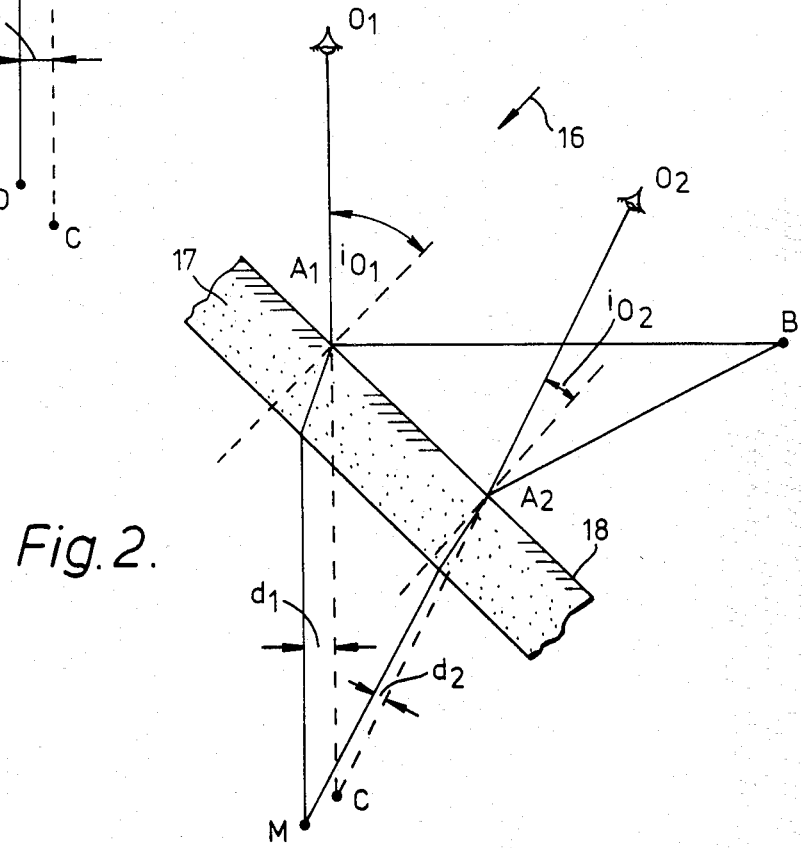

In FIGS. 1 and 2 there is shown a conventional part-reflecting mirror device 16 consisting of a single sheet of glass 17 having a half-silvered surface 18. FIGS. 1 and 2 illustrate the effect of using such a conventional mirror device in an apparatus for determining the position of a point on an object or the shape of a portion thereof, FIG. 1 illustrating the effect when monocular viewing is effected from a point O, and FIG. 2 illustrating the effect when binocular viewing is effected from points $O_1$, $O_2$.

As shown in FIG. 1, an object B is imaged at C by reflection at the surface 18 at A, such that AB=AC, angle $i_o = i_b$, and OAC is a straight line. The optical path of the light from a measuring mark D, however, in order to coincide with the line AO, will be DEAO, where DE, AO and CF are parallel. The line of sight DE is refracted by the glass sheet 17 to assume the direction EA such that $$\frac{\sin i_b}{\sin r} = \frac{na}{ng}$$

where na is the refractive index of air ng is the refractive index of the glass of the sheet 17.

Moreover, because the sheet 17 is optically denser than the air, the light cannot travel as quickly along AE, and consequently the length AED is not equal to the length AC. The measuring mark D is thus not only displaced laterally by a displacement d, shown in FIG. 1, from its desired position C, but is closer to the glass sheet 17.

When binocular vision is considered, as illustrated in FIG. 2, if a measuring mark M is to coincide with the image C, the light paths from the measuring mark M and the object B should enter the eyes of the observer at points $O_1$, $O_2$ along the same direction $A_1$, $O_1$ and $A_2$, $O_2$ respectively. Clearly the measuring mark M will thus not coincide with the image C when it appears to the observer to do so.

It can be shown that the displacement d (FIG. 1) = t(sin i = cos i tan r), where i is the angle of incidence of the light ray from the object B.

Because of this variation of the displacement d with the angle of incidence i, the measuring mark M will no longer coincide with the image C of the object B when the observer moves his eyes to a new position. Unless, therefore, he can return his eyes to exactly the same position every time, he will not be able to repeat a reading. As a numerical example, if the glass sheet 17 is 6 mm thick, and if the observer views the image C from directly behind the object B and places the measuring mark M in coincidence, then a movement of the observer's eyes to where the angle of incidence i is about 40° will produce an apparent shift of the measuring mark M of about 1.5–2 mm.

Thus, as will be appreciated from the above, the use of a conventional part-reflecting mirror device comprising one single sheet of glass gives rise to parallax errors due to the fact that the image arrives at the observer's eye or eyes without passing through any glass, since it is reflected from the front face of the mirror device, but the light from the measuring mark is refracted through the glass.

If, however, the angle of incidence $i_{o1}$ of the line $O_1A_1$ and the angle of incidence $i_{o2}$ of the line $O_2A_2$ can be kept constant, the deflections $d_1$, $d_2$ of the measuring mark M and of the image C will always be the same. The error MC in FIG. 2 will then be a constant both in size and direction and can thus be ignored as an origin shift in the X, Y and Z co-ordinates. Accordingly, in the apparatus of FIGS. 3–5, these angles $i_{o1}$ and $i_{o2}$ are fixed, as will be explained below.

Figure 3:
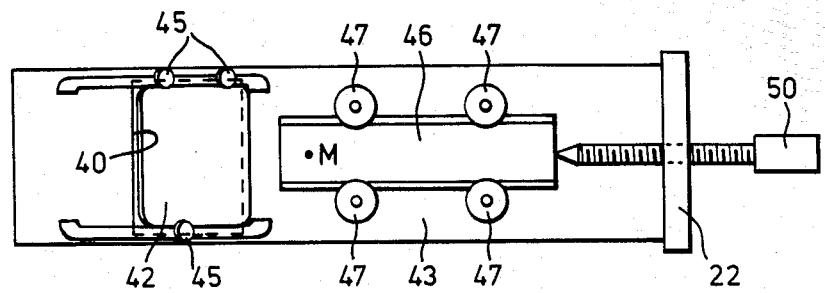
FIGS. 3 and 4 are respectively a plan view and a sectional elevation of a plotter or other apparatus according to the present invention for determining the position of a point on an object or the shape of a portion thereof.
Figure 4:
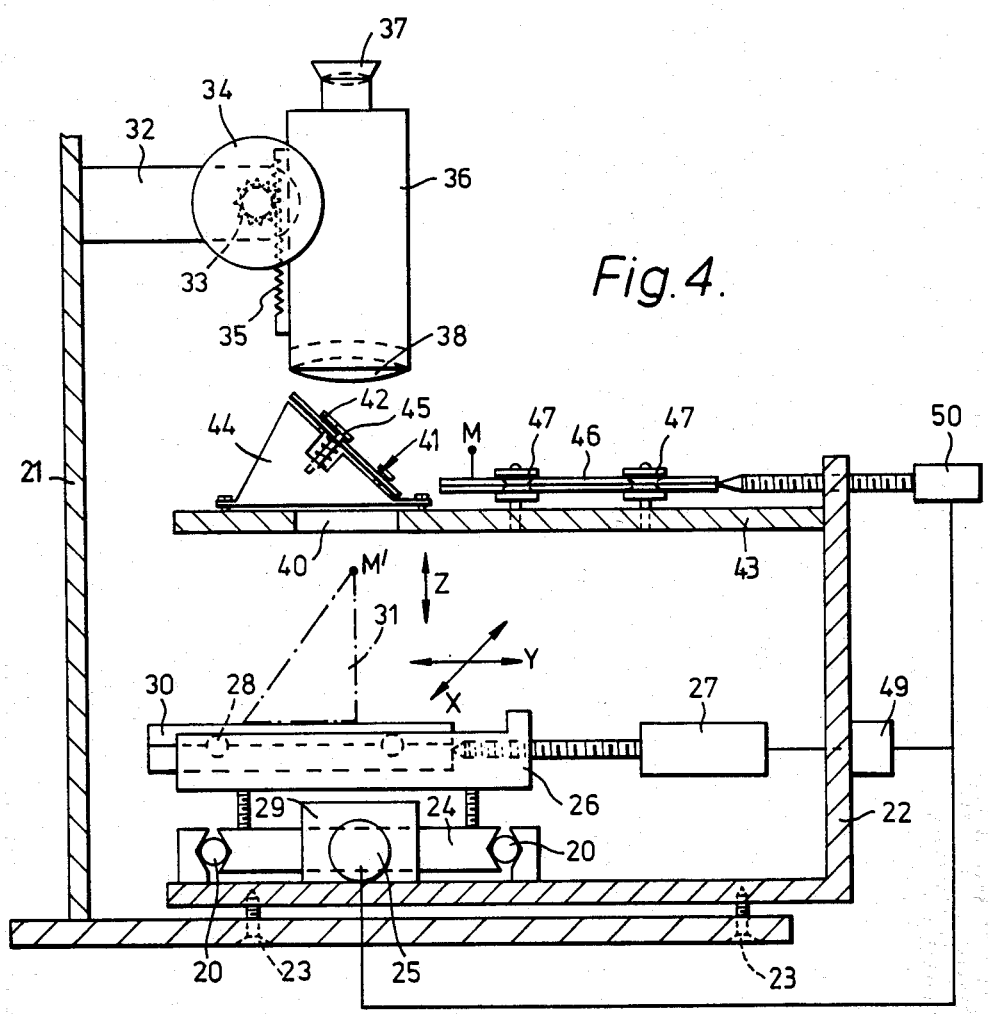
Figure 5:
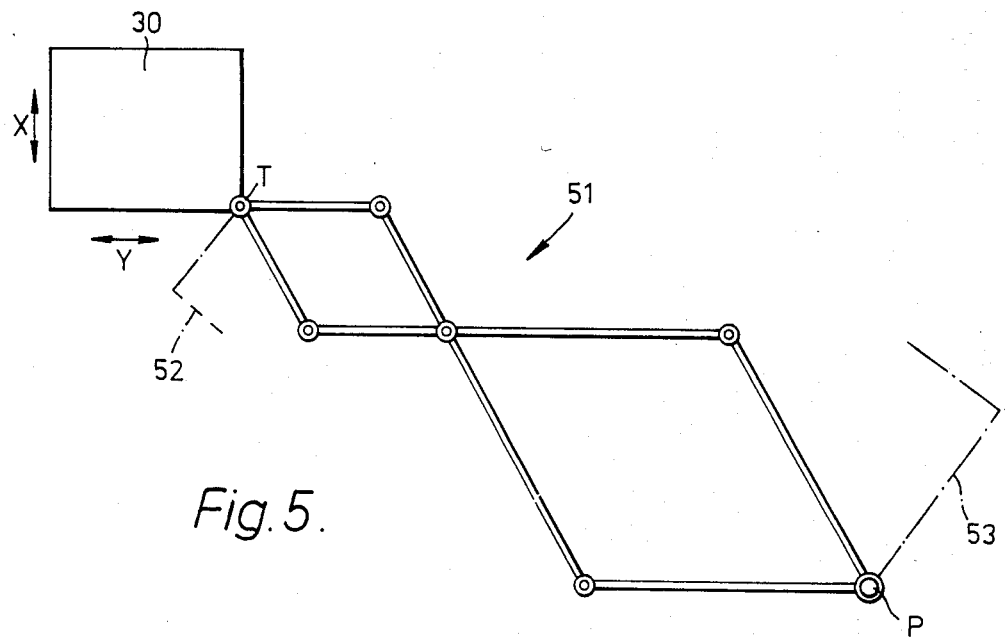
FIG. 5 is a diagrammatic plan view of a part of the apparatus of FIGS. 3 and 4.

Referring now to FIGS. 3–5, a plotter or other apparatus according to the present invention comprises a frame having L-shaped portions 21, 22 which are secured together by screws 23. Mounted on the base part of the L-shaped frame portion 22 is an "X" carriage 24, which is mounted for sliding movement in ball races 20 and which can be moved in the X direction by means of a micrometer screw 25 which passes through a block 29 secured to the frame portion 22. The "X" carriage 24 supports a "Y" carriage 26 which can be moved in the Y direction by means of a micrometer screw 27 which passes through fixed structure (not shown). The Y carriage 26 supports, by way of a ball race 28, an object table 30 on which may be mounted an object 31, e.g. an object whose contours are to be plotted. The object table 30 may thus be moved in the X and Y directions by means of the screws 25, 27.

The vertical part of the L-shaped frame portion 21 has a horizontal arm 32 in which is rotatably mounted a pinion 33 which is rotatable by means of a handwheel 34. The pinion 33 meshes with a rack 35 carried by an optical viewing device 36. The optical viewing device 36 has two eyepieces 37 and lens systems 38 (only one shown), one for each eye of the user, whereby the optical viewing device 36 may be used for viewing the object 31 on the object table 30. The optical viewing device 36 may thus be constituted by two telescopes or by a stereoscopic microscope. It is not, however, essential for the optical viewing device 36 to provide any magnification.

A mirror device 41, which is disposed between the optical viewing device 36 and the object table 30, comprises a part-reflecting mirror 42. The mirror device 41 is mounted on an horizontal arm 43 carried by the vertical part of the L-shaped frame portion 22. The part-reflecting mirror 42 is supported on a stand 44 carried by the arm 43 and is adjustably secured to the stand 44 by three mirror attitute adjustment screws 45 such that relative adjustment of the latter enables the attitude of the part-reflecting mirror 42 to be adjusted as described below. The arm 43 has an aperture 40 therein immediately beneath the mirror device 41.

A "Z" carriage 46 is supported for sliding movement by rollers 47 mounted in the arm 43 and is movable towards the mirror device 41 by a micrometer screw 50. A spring (not shown) is used to urge the "Z" carriage 46 away from the mirror device 41, and similar springs (not shown) are used in association with the screws 25, 27. The position of the micrometer screw 50 with respect to a datum (not shown) is thus representative of the height of the image M' above the object table.

The "Z" carriage 46 carries a measuring mark or index M which is thus disposed to the side of the mirror device 41 adjacent to the optical viewing device 36. The measuring mark M may, for instance, be constituted by a point light source. The movement of the "Z" carriage 46 (parallel to that of the "Y" carriage 26) enables the image M' of the measuring mark M to be moved in the Z direction and into coincidence with a point on the object whose position is to be plotted. By operating the handwheel 34 the optical viewing device 36 may be moved towards and away from the mirror device 41 to enable the optical viewing device 36 to be focused both on the image M' and on the said point whose position is to be plotted.

Where the apparatus described above is used as a plotter, the object table 30 may be connected at T to a pantograph 51 and thus to a plotting pencil P which is movable over paper supported on a plotting table (not shown). Thus the pantograph 51 magnifies and inverts the plot 52 which would be produced at T so as to produce a plot 53.

The graduations (not shown) on the micrometer screws 25, 27, 50 themselves provide readings of the X, Y and Z co-ordinates of a point whose position is being plotted. However, the micrometer screws 25, 27, 50 may, if desired, be replaced by electronically digitised lead screws (not shown) which provide at an indicator 49 a reading of the setting of the lead screws and thus of the X, Y and Z co-ordinates of the point being plotted. Moreover, the digital electronic outputs from the lead screws may if desired be arranged (by means not shown) to move the plotting pencil P over paper supported by the plotting table.

In operation, the object 31 is placed on the object table 30 beneath the aperture 40 and so that the optical viewing device 36 and the object 31 are disposed substantially in a common plane. The attitude of the part-reflecting mirror 42 is adjusted by the adjustment screws 45 so that it is fixed at an angle of 45° to the said common plane. Once this has been done, although the optical viewing device 36 can be raised and lowered away from and towards the part-reflecting mirror 42, no other movement between these parts will occur during the operation of the apparatus since they are held by the common frame 21, 22. Thus the user of the apparatus does not need to move his head around during the operation of the apparatus other than to follow any raising or lowering of the optical viewing device 36 which may be necessary to maintain the measuring mark M' in focus.

If now it is desired to produce, say, a contour at a specific height of the object 31, the "Z" carriage 46 is moved by the screw 50 to a position corresponding to the height of the required contour, whereby the image M' which is below the part-reflecting mirror 42, will be disposed at a predetermined height above the object table 30. The image M' is viewed through the optical viewing device 36 and through the part-reflecting mirror 42, the handwheel 34 being used to enable the optical viewing device 36 to be focused on the image M'. Since the image M' will remain stationary throughout the plotting of the contour, further movement of the optical viewing device 36 during this plotting of the contour will not occur. The image M' is then, in effect, caused to follow the contour by moving the "X" carriage 24 and the "Y" carriage 26 by means of the screws 25, 27 respectively. In fact, of course, the image M' itself will not move, but the object table 30 will be moved in such a way as to cause successive points on the contour to be maintained in coincidence with the image M'. Such movement of the object table 30 will cause like movement of the plotting pencil P over paper supported on the plotting table.

Similarly, as will be readily understood, if it is required to know the X, Y and Z co-ordinates of a specific point on the object 31, this may be achieved by adjusting the "X", "Y", and "Z" carriages 24, 26, 46 until the image M' is in coincidence with the said specific point, and either reading off the co-ordinates from the graduations of the screws 25,27,50 or noting the digitised readings appearing at the indicator 49.

Since the object 31 is viewed through the part-reflecting mirror 42, refraction of the light passing through the part-reflecting mirror 42 will occur as explained above, the mark M being seen by reflection. However, since the optical viewing device 36 is not moved (other than vertically, if necessary) in relation to the part-reflecting mirror 42, the lines of sight from the eyepieces of the optical viewing device 36 are not moved and therefore their angles of incidence with the part-reflecting mirror 42 remain constant. Consequently, as explained above with reference to FIG. 2, the displacement of the image M' due to refraction is constant both in size and direction and can be ignored as an origin shift in X, Y and Z.

Either the front surface or the rear surface of the part-reflecting mirror 42 may be semi-silvered or coated with aluminium or titanium to increase its reflectance in comparison with the other surface so as to make it easier to use the plotter. If the reflectance of the front surface is made dominant, the light from the object 31 will be refracted but the light from the measuring mark M will not be refracted. If, on the other hand, the reflectance of the rear surface is made dominant, the light from the measuring mark M will be doubly refracted while the light from the object 31 will be only singly refracted.

Figure 6:
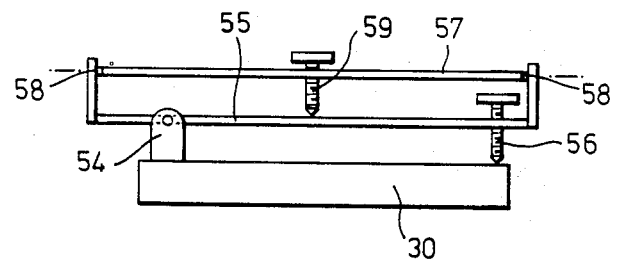
FIG. 6 is a diagrammatic elevation of a device which may form part of the apparatus of FIGS. 3–5.

The object table 30 may be tiltable about the X and Y axes to enable the object 31 to be levelled with respect to a predetermined datum. Thus as shown in FIG. 6, the object table 30 may be provided with a pivot 54 which acts as a fulcrum for a plate 55. The plate 55 has an adjustment screw (or screws) 56 which bears against the object table 30 and which may be adjusted so as to alter the attitude of the plate 55 with respect to the X axis. The plate 55 supports a table 57 at pivots 58, the table 57 having an adjustment screw (or screws) 59 which engages the plate 55 and which can be adjusted so as to alter the attitude of the table 57 with respect to the Y axis. Thus an object 31 supported on the table 57 can be levelled about the X and Y axis with respect to the datum.

The part-reflecting mirror 42 has been described above as being at an angle of 45° to the plane containing the optical viewing device 36 and the object 31. This is a convenient orientation of the part-reflecting mirror 42 since it enables the "Z" carriage 46 to be moved horizontally. However, the part-reflecting mirror 42 may be set at other angles in which case the "Z" carriage 46 will have to be arranged to move so that the image of the measuring mark or index moves in a direction normal to the XY plane.

As described above, the optical viewing device 36, the part-reflecting mirror 42 and the object table 30 and arranged linearly of each other. However, the optical viewing means 36 could, if desired, be arranged laterally of the part-reflecting mirror 42 so that light from the object 31 is reflected by the part-reflecting mirror 42 to the optical viewing device 36.

I claim:

1. Apparatus, including a part-reflecting mirror device, for precisely determining the position of a point on a three-dimensional object despite parallax errors inherent in using said mirror device, the apparatus comprising:

a movable object table for supporting the three-dimensional object;

a measuring index;

an optical viewing device providing two non-parallel lines of sight directed toward the object table;

a part-reflecting mirror device arrange to enable an image of the measuring mark to be brought into coincidence with said point when the object is viewed through the optical viewing device;

means constraining the two lines of sight to be directionally constant in space, relative to the mirror device;

movement effecting means for effecting relative movement of the object table and of the measuring index so as to bring the image of the measuring index to said coincidence; and, indicator means responsive to said movement effecting means for indicating the position of said point, whereby the constrained relationship between the two lines of sight and the mirror device renders all parallax errors constant, and therefore of no adverse consequence in making precise measurements.

2. Apparatus as claimed in claim 1, wherein the optical viewing device, the part-reflecting mirror, and the object table are arranged linearly of each other.

3. Apparatus as claimed in claim 1, wherein the measuring index is disposed to the side of the mirror device adjacent said optical viewing device.

4. Apparatus as claimed in claim 3, further comprising:
means for moving the object table in X and Y directions of a three dimensional coordinate system; and,
means for moving the measuring index towards and away from the mirror device to enable an image of the measuring index to be moved in the Z direction of the coodinate system.

5. Apparatus as claimed in claim 4, wherein the measuring index is carried by a Z carriage which is mounted for movement in the direction of the Y axis.

6. Apparatus as claimed in claims 1, 2, 3, 4 or 5, further comprising means for adjusting the optical viewing device to enable it to be focused both on said point on the object and on said image.

7. Apparatus as claimed in claim 6, wherein the optical viewing device is adjustable by movement towards and away from the mirror device.

8. Apparatus as claimed in claims 1, 2, 3, 4 or 5, wherein the mirror device comprises a part-reflecting mirror one of whose opposite surfaces is treated so that its reflectance is greater than the other.

9. Apparatus as claimed in claim 1, wherein the optical viewing device is a stereoscopic microscope.

10. Apparatus as claimed in claim 1, wherein the optical viewing device comprises two telescopes.

11. Apparatus as claimed in claim 1, further comprising a common frame carrying the optical viewing device and the mirror device.

12. Apparatus as claimed in claim 1, further comprising means for levelling the oject table with respect to a datum.

13. Apparatus as claimed in claim 1, further comprising means for providing a digital indication of the setting of the movement effecting means and thereby of the X, Y and Z co-ordinates of said point with respect to a three dimensional co-ordinate system.

14. Apparatus as claimed in claim 1, further comprising a plotting member, the object table being connected to the plotting member.

15. A method utilizing a part-reflecting device for precisely determining the position of a point on a three-dimensional object despite parallax errors inherent in using said mirror device, comprising the steps of:
disposing the three-dimensional object on a movable support;
using an optical viewing device providing two non-parallel lines of sight to view the object by way of a part-reflecting mirror device;
constraining the two lines of sight to be directionally constant in space, relative to the mirror device;
bringing an image of a measuring index into coincidence with said point on the object by effecting relative movement of the object and of the measuring index; and,
determining the position of the point from the relative positions of the object and of the measuring index, whereby the constrained relationship between the two lines of sight and the mirror device renders all parallax errors constant, and therefore of no adverse consequence in making precise measurements.

* * * * *